N. POWER.
TENSION DEVICE FOR MOVING PICTURE MACHINES.
APPLICATION FILED JUNE 6, 1916.

1,270,866.

Patented July 2, 1918.

Inventor
Nicholas Power
By his Attorney
W. B. Morton

UNITED STATES PATENT OFFICE.

NICHOLAS POWER, OF BROOKLYN, NEW YORK, ASSIGNOR TO NICHOLAS POWER COMPANY, OF NEW YORK, N. Y., A CORPORATION OF DELAWARE.

TENSION DEVICE FOR MOVING-PICTURE MACHINES.

1,270,866.  Specification of Letters Patent.  Patented July 2, 1918.

Application filed June 6, 1916. Serial No. 102,069.

*To all whom it may concern:*

Be it known that I, NICHOLAS POWER, a citizen of the United States, and a resident of the borough of Brooklyn, city and State of New York, have invented new and useful Improvements in Tension Devices for Moving-Picture Machines, of which the following is a specification.

This invention relates to improvements in motion picture machines and particularly to improvements in the so-called tension guides for maintaining the film in position for projection at the aperture.

In motion picture machines as now universally constructed the film is fed intermittently past the aperture to bring the successive pictures on the film strip into registration with the aperture for projection on the screen. As the motion of the film is extremely rapid, the complete substitution of the successive pictures being effected in about one eightieth of a second, it is essential that means be provided to bring the film to an immediate stop on the cessation of the movement of the intermittent sprocket and to maintain it fixed during the interval of projection, as otherwise the picture on the screen will be blurred by the movement or vibration of the film.

For this purpose it is customary to provide on each side of the aperture a spring-held shoe pressing against the margin of the film to act as a brake applying a fixed resistance to the passage of the film across the aperture when the film is in motion and holding the film taut at the aperture when the film is stationary. The springs for the tension shoes which are necessarily delicate, are subject to vibrations produced by the passage of the film across the face of the tension shoes, and however carefully constructed, are subject to occasional breakage, which renders the machine inoperative until the spring can be repaired.

One object of my present invention is to provide a construction for tensioning the film at the aperture constructed in a separate unit and detachably mounted on the motion picture machine so that in the event of breakage or other accident to any of its parts it may be quickly removed and replaced by a duplicate device to thereby avoid interruption of the exhibition for more than a moment's time.

A further object of the invention is to provide a construction of this character, especially adapted for machines in which the mechanism is inclosed in a complete casing for protection against fire, in which the tension of the springs and consequently the pressure on the film at the aperture may be easily and delicately adjusted from without the casing without stopping the machine or interfering with the exhibition of the picture.

A further object of the invention is to provide a tensioning device consisting of separate upper and lower members, each member having a separate spring and arranged so that the breakage of the spring for one member will not interfere with the operation of the other member, whereby the operation of the machine may be continued with the single member until the end of the reel or other convenient point for stopping to substitute the duplicate tension device, is reached.

The invention also provides means whereby both springs are simultaneously and uniformly adjusted by the single adjusting member outside of the casing.

In the accompanying drawings I have illustrated a preferred embodiment of my invention as shown in connection with an improved moving picture machine forming the subject-matter of my copending application Serial No. 102,068, filed June 6, 1916.

In said drawings.

Figure 1:
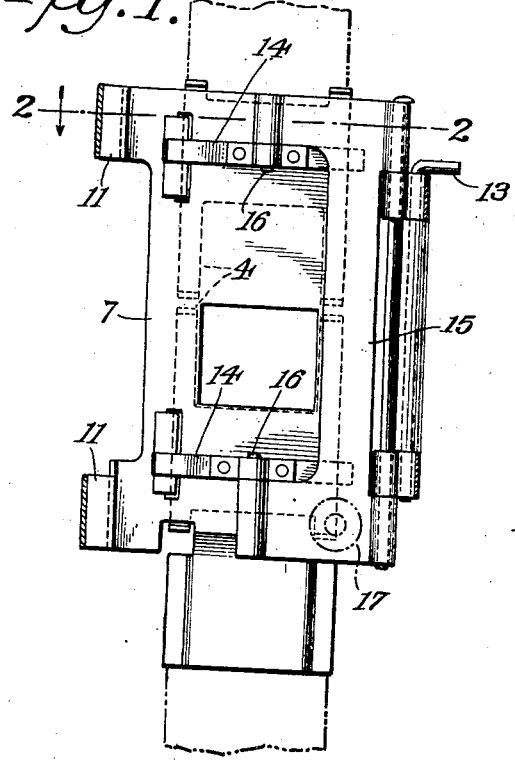
Figure 1 is an elevational view of my improved tension device shown detached from the machine looking from the rear.
Figure 3:
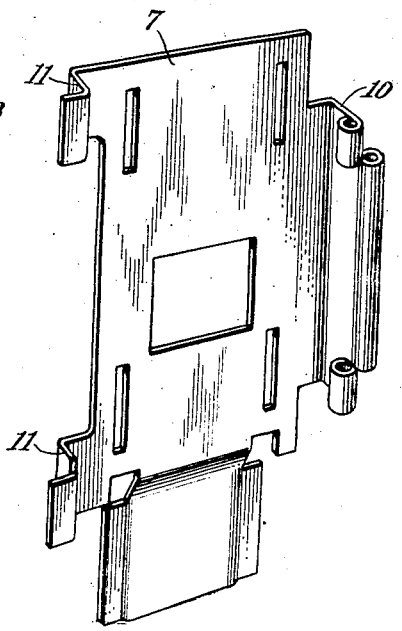
Figs. 3 and 4 are detail perspective views of portions of the device.

Referring to the drawings, 1 indicates the fixed portion of the machine in which the projection aperture 2 is formed and across the face of which the film is guided. On each side of the aperture 2 a track or marginal guide 5 is provided for coöperation with the tension shoes to hold the film in proper position in front of the aperture and guide it in its passage from the upper to the lower feed devices.

The tension devices forming the subject-matter of this application are supported on the inner face of the rear door or wall 3 of the casing in position for the film engaging shoes 4 to press against the film opposite the marginal guides 5 on each side of the aperture. The shoes 4 are arranged in upper and lower pairs, the shoes of each pair being connected by a cross piece 6 and each pair of shoes is supported in the carrying plate or bridge 7 by means of rearwardly bent projections 8 at the outer edge of each shoe, the projections extending through slots in the face of the plate. The shoes are held against displacement by means of plates 9 attached to each of the projections back of the plate, the plates being arranged to permit the necessary movement of the shoes to secure the desired spring pressure against the film.

The bridge 7 is formed at each edge with rearwardly bent side flanges 10 and 11, one of which is shaped to form a hinge for connecting the bridge to the door 3. The other flanges 11 are laterally bent to engage under a rib 12 attached to the door 3 along the other side of the aperture.

In order to permit the bridge to be readily disconnected from the door the hinge between the bridge and the bracket is provided with a detachable hinge pin 13 which may be readily withdrawn to release the bridge by means of its laterally bent upward end as shown in Fig. 1 of the drawing.

Figure 2:
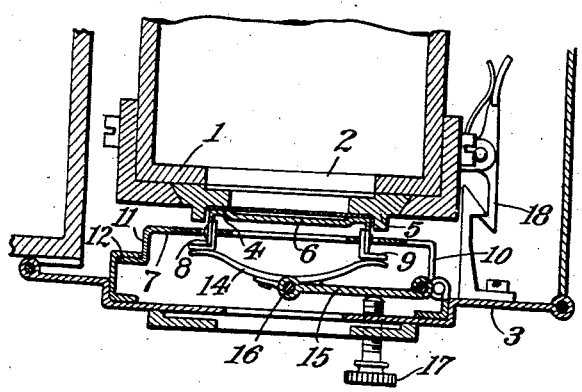
Fig. 2 is a sectional view on line 2—2 of Fig. 1 showing the adjacent portions of the moving picture machine.
Figure 4:
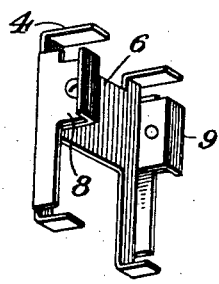

The spring pressure is applied to the shoes 4 by means of bow-springs 14, one of which is provided for each pair of shoes, the springs extending horizontally across the back of the bridge with their ends pressing against the projections 8. The springs are supported on a plate 15 hinged to the edge of the bridge adjacent the supporting hinge, the hinged portions of the bridge behinge formed by oppositely bending the metal intermediate the parts of the first hinge in the opposite direction as indicated in Fig. 2.

The springs 14 are pivotally mounted above and below the edges of the plate 15 on vertical pins 16 attached to the backs of the springs at their middle points, and turning in suitable eyes formed in the edges of the plate 15.

The tension of the springs is adjusted by means of an adjusting screw 17 threaded in the door 3 pressing against the plate 15 to thereby equally distribute the pressure of the two springs. The springs are sufficiently compressed by the adjusting screw to hold the edge of the bridge against the rib 12 when the door is open and the springs may expand the full distance permitted by the plates 9 on the ends of the projections 8 to thereby prevent rattling of the parts when the door is open.

After the film is brought across the aperture the door 3 is closed to bring the tension shoes into engagement with the margin of the film to hold the film in position for operation. The door is provided with a latch 18 for holding it closed.

In operation the tension shoes act in the usual manner to retard the intermittent movement of the film and hold the film at rest during the projection of the picture. The division of the tension shoes in two separate pairs distributes the pressure evenly over the film and in the event of the breakage of the spring of one pair of shoes the exhibition need not immediately be halted, but by increasing the pressure of the other spring through the adjusting screw 17 the film is sufficiently retarded by a single shoe for the exhibition to be continued until the entire reel has been shown. The entire tension mechanism may then be removed as a unit by simply withdrawing the hinge pin 13 and replacing it with an already assembled duplicate device.

It frequently happens when running a new film that the shoes become so coated with the emulsion which unavoidably spreads to some extent to the margins of the film, as to offer an undue resistance to the movement of the film rendering it liable to be torn by the pull of the intermittent. In such case the entire tension device may be easily replaced with a much shorter interruption of the exhibition than is necessary to clean the emulsion off of the shoes.

Another advantage of my improved mechanism is the space provided between the bridge and the door which may be used for a safety shutter, as in my copending application before referred to. It is desirable to provide this space also for the purpose of allowing circulation of air between the bridge and the gate to prevent the bridge and its attached parts overheating. The loose connection between the shoes and the bridge also prevents the shoes receiving much heat by conduction, which is desirable to avoid as far as possible softening the emulsion on the film.

I claim:

1. A tension device for moving picture machines comprising a gate hinged to the machine frame, a supporting member detachably connected to said gate and tension devices for both marginal edges of the film wholly supported on said detachable member, said supporting member and tension devices being detachable as a unit from said gate.

2. In a tension device for moving picture machines a supporting member detachably connected to the machine frame, a film engaging member movably supported in said supporting member and having shoes positioned to engage the opposite margins of the film, a spring pressing said shoes against the film, and a member supporting said spring pivotally mounted on said supporting member.

3. In a tension device for moving picture machines a supporting member detachably connected to the machine frame, a pair of film engaging members movably supported in said supporting member and having shoes positioned to engage the opposite margins of the film, a spring for each of said members pressing said shoes against the film and a member supporting both said springs pivotally mounted on said supporting member.

4. In a tension device for moving picture machines a supporting member detachably connected to the machine frame, a film engaging member movably supported in said supporting member and having shoes positioned to engage the opposite margins of the film, a spring pressing said shoes against the film, and a member supporting said spring pivotally mounted on said supporting member, an abutment for said spring carried by the frame whereby said spring holds said supporting member against lost motion.

5. In a tension device for moving picture machines comprising a supporting member having a detachable pivotal connection with the machine at one edge of said member, a stop attached to said machine and engaging the opposite edge of said member, a film engaging part movably mounted in said supporting member, a spring engaging said part for pressing said part against the film and an abutment for said spring carried by the machine whereby said spring holds said supporting member against said stop.

6. In a moving picture machine having a fixed frame part provided with a projection aperture, a hinged gate mounted for movement toward and from said aperture, a tension device for the film at the aperture carried by said gate, said tension device comprising a supporting member detachably mounted on said gate, film engaging parts for yieldingly engaging both margins of the film mounted on said supporting member, and a single connection between said supporting member and said gate whereby said supporting member and tension devices are detachable as a unit.

7. In a moving picture machine having a fixed frame part provided with a projection aperture, a hinged gate mounted for movement toward and from said aperture, a tension device for the film at the aperture carried by said gate, said tension device comprising a supporting member detachably mounted on said gate and a plurality of separate film engaging parts for yieldingly engaging both margins of the film mounted on said supporting member, separate springs for said parts positioned between said gate and said member, a common support for said springs, said support being mounted on said member, and means operatable from the opposite gate for adjusting said spring-carrying member to vary the tension of said springs.

Signed at New York city, in the county of New York and State of New York this 19th day of May, 1916.

NICHOLAS POWER.